United States Patent [19]
Potter et al.

[11] 3,786,858

[45] Jan. 22, 1974

[54] METHOD OF EXTRACTING HEAT FROM DRY GEOTHERMAL RESERVOIRS

[75] Inventors: Robert M. Potter; Eugene S. Robinson; Morton C. Smith, all of Los Alamos, N. Mex.

[73] Assignee: The United States of America as represented by the United States Atomic Energy Commission, Washington, D.C.

[22] Filed: Mar. 27, 1972

[21] Appl. No.: 238,435

[52] U.S. Cl.......................... 165/1, 165/45, 166/247
[51] Int. Cl............................................. F28d 21/00
[58] Field of Search .................... 165/1, 45; 166/247

[56] References Cited
UNITED STATES PATENTS
3,640,336   2/1972   Dixon .................................... 165/1

Primary Examiner—Charles Sukalo
Attorney, Agent, or Firm—John A. Horan

[57] ABSTRACT

Hydraulic fracturing is used to interconnect two or more holes which penetrate a previously dry geothermal reservoir, and to produce within the reservoir a sufficiently large heat-transfer surface so that heat can be extracted from the reservoir at a usefully high rate by a fluid entering it through one hole and leaving it through another. Introduction of a fluid into the reservoir to remove heat from it and establishment of natural (unpumped) convective circulation through the reservoir to accomplish continuous heat removal are important and novel features of the method.

5 Claims, 2 Drawing Figures

METHOD OF EXTRACTING HEAT FROM DRY GEOTHERMAL RESERVOIRS

The invention disclosed herein was made in the course of, or under, a contract with the U. S. Atomic Energy Commission. It relates to a method of extracting energy from a dry geothermal reservoir.

BACKGROUND OF THE INVENTION

Many regions are known in which volcanic or intrusive activity has occurred recently enough so that the geothermal gradient is still as high as 150° to 190° C/km (435° to 550° F/mile). In such regions, temperatures high enough to produce commercially useful steam exist within 2 to 3 km (6,600 to 9,800 ft) of the earth's surface. In a few of these places (including northern Italy, New Zealand, northwestern Mexico, and both northern and southern California) a fortunate combination of geological events has caused the hot rock to be naturally permeable or sufficiently fragmented so that it is accessible to circulating ground water, and to be overlain by impermeable rock strata which have prevented its rapid cooling by the free escape of steam or hot water. Where the overlying strata are penetrated locally by natural fissures or by drilled holes, natural steam is avilable for the economical generation of power or for other uses.

Where natural steam is not produced, the exploitation of these geothermal reservoirs has not so far been undertaken, in spite of the fact that many of them are closer to the earth's surface than are the lower levels of a deep mine. In part this is because of the difficulty of drilling or tunneling into the hot, hard, crystalline rocks that compose most geothermal reservoirs. Principally, however, it is because the thermal conductivities of rocks are typically very low. Their specific heats are high, so that a relatively large amount of heat is available from a unit volume of the hot rock. This heat, however, can be extracted from the rock only through some free surface, such as the wall of a borehole. Since heat is conducted to that surface quite slowly, a very large surface is required if thermal energy is to be removed from the rock at a usefully high rate. It has generally been assumed that the creation of the required amount of heat-transfer surface within a dense, crystalline rock is not practical by existing methods. In fact, the common oil-field technique of hydraulic fracturing appears to represent a simple and practical method of developing the necessary new surface.

Hydraulic fracturing is a technique commonly used in the petroleum and natural gas industries to create a system of cracks in the rock adjacent to a borehole. These cracks facilitate the flow of crude petroleum or natural gas from the surrounding formations into the well. Hydraulic fracturing is normally done by inserting temporary seals in the well above and below the zone to be fractured, perforating the casing somewhere between these seals, and using a high-pressure pump to produce hydrostatic pressure in this zone of the order of a few hundreds to a few thousands of psi above the horizontal component of the overburden pressure. A crack system is created which may extend for many feet from the hole, the resulting increase in volume being accommodated locally by natural porosity and by elastic compression of the uncracked rock. Carefully sized sand is usually injected with the fracturing fluid to prop the cracks open with a strong but permeable supporting material, so that they will not spring shut when the fracturing pressure is released. This technique of creating an extended crack system in deeply buried rock has been used extensively in a wide variety of sedimentary formations whose strength properties approach those of common crystalline rocks. For example, Halliburton, 1971, cites hydraulic fracturing at 12,000 to 15,000 ft depth in the Ellenburger formation of West Texas, which is a strong, massive limestone having properties very similar to those of a granite. Because rocks are relatively weak in tension and because the horizontal component of lithostatic pressure is generally much less than the vertical component, the fluid pressure required to produce fracturing is much less than might initally be supposed.

Another method of extracting geothermal energy is suggested in "A Proposal for a Nuclear Power Program," by George C. Kennedy, USAEC Third Plowshare Symposium, University of California at Davis (1964). This report discloses a nuclear device which would be detonated at the bottom of a hole creating a large, rubble-filled chimney of rock and a region surrounding said chimney of fractured rock. In this report the water is allowed to boil in the reservoir resulting in a marked decrease in fluid viscosity and therefore it is limited to the heat content of the initial rubble-filled cavity. Also a pressurized water cycle was considered. This approach was abandoned because of potentially large amounts of radioactive fission products that would be brought to the surface by the circulating hot water and subsequently precipitated out on the tube wall surfaces of the power plant boiler.

SUMMARY OF THE INVENTION

This invention states a means of extracting very large amounts of thermal energy from the many regions of the earth's surface known to contain abnormally hot—but essentially dry—rock at depths presently attainable using conventional drilling methods (to depths of the order of 20,000 ft or so). Dry is defined in this application as not containing sufficient amounts of naturally occurring steam or hot water to make these regions economically attractive as conventional (wet) geothermal energy sources.

After drilling into sufficiently hot rock, varying from about 150° to 500° C, depending on both the economics of and proposed use for the heat, and the costs of drilling; a very large heat transfer surface is created by hydraulically fracturing the surrounding rock at or near the bottom of the hole. The fracture system thus formed will normally be in the form of a very large but thin vertical circular disc (actually an oblate spheroid), with a radius of the order of thousands of feet. However, the fracture system may also be in the form of multiple vertical circular cracks radiating out from the well bore.

The upper portion of the fracture system will then be connected to the surface with a shallower drilled hole (or by a concentric, insulated, counter-current flow passage in the initial drilled hole). A circulating water loop will then be established: down the deeper hole, through the fracture system, up the shallower hole to the surface, and through the primary heat exchanger of a suitable power plant.

GENERAL DESCRIPTION OF THE DRAWINGS

DESCRIPTION OF THE PREFERRED EMBODIMENTS

Figure 1:
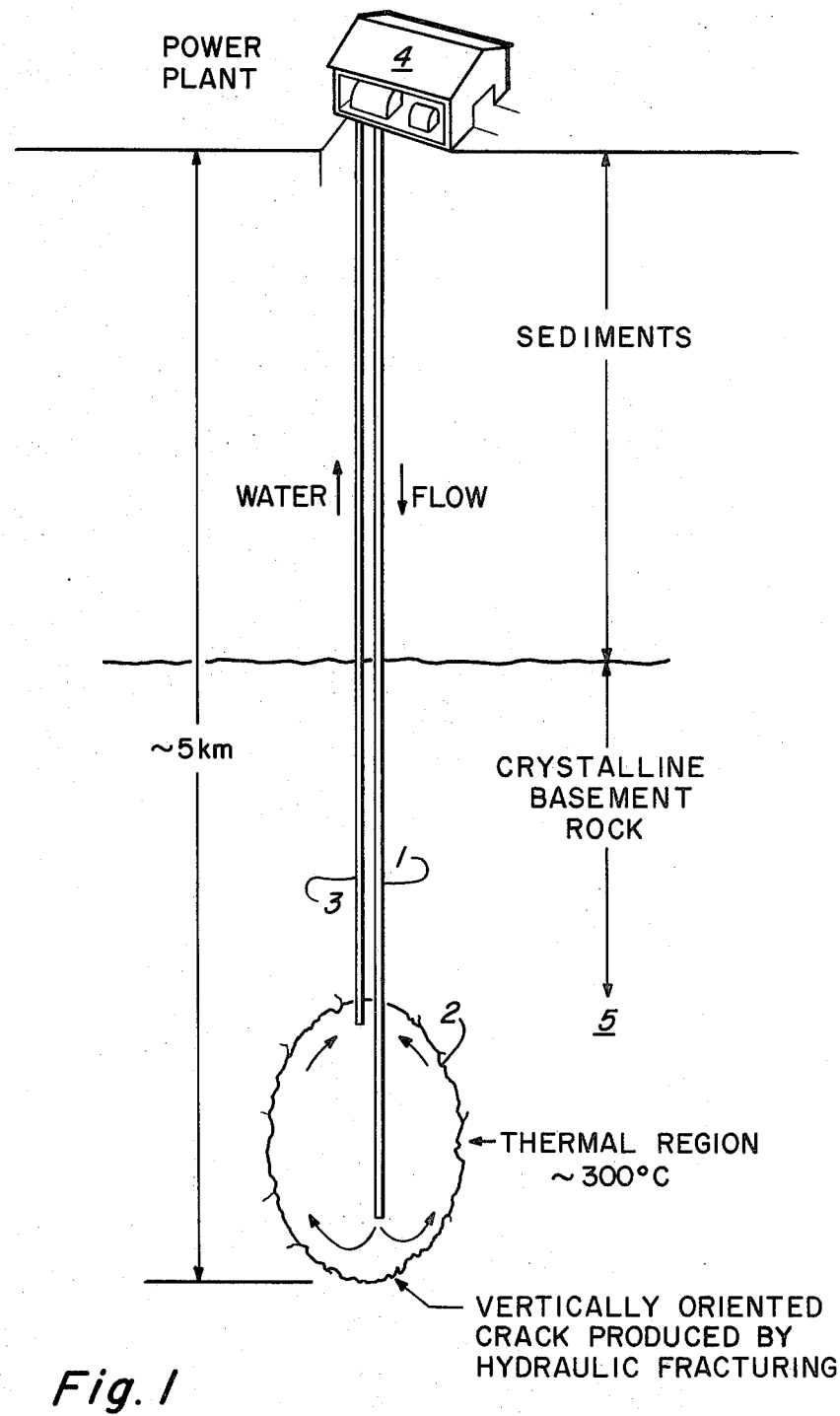
FIG. 1 is a schematic view of one embodiment of this invention.

The geothermal system of this invention is shown schematically in FIG. 1. The upper parts of both holes, through the sedimentary and/or volcanic sections are drilled 17½ inches in diameter and lined with 13⅜ inch steel casing, cemented in place. The first (deeper) hole is extended at a 12 inch diameter to a depth of about 14,800 ft or until a rock temperature of about 300° C is encountered. This section is cased with 9⅝ inch casing 1. The hole is continued for an additional 200 ft or so with an 8⅝ inch bit, and this last section of hole is left uncased. At a point about 1,200 ft above the bottom of the hole, the casing is jet perforated. A string of 7-inch high-pressure tubing would be run down the hole, which would be packed-off above the perforated zone. The crystalline rock is fractured hydraulically, and the resulting crack 2 extends out to a radius of about 1,500 to 4,000 ft. The second drill hole 3, at a location chosen to encounter the upper part of the initial hydraulically fractured crack system, is drilled through the crystalline rock 5 at a 12-inch diameter until the desired intersection occurs. If circulation to the first hole has not then been established, directional drilling would be used from this point to probe for the crack system 2. The cold water pipe inflow system 1 is connected through the vertical hydraulically fractured crystalline basement rock 5 to the return hot water pipe system 3 which in turn is connected to a heat exchanger, turbine means, and a conventional power plant 4 at the surface.

Figure 2:
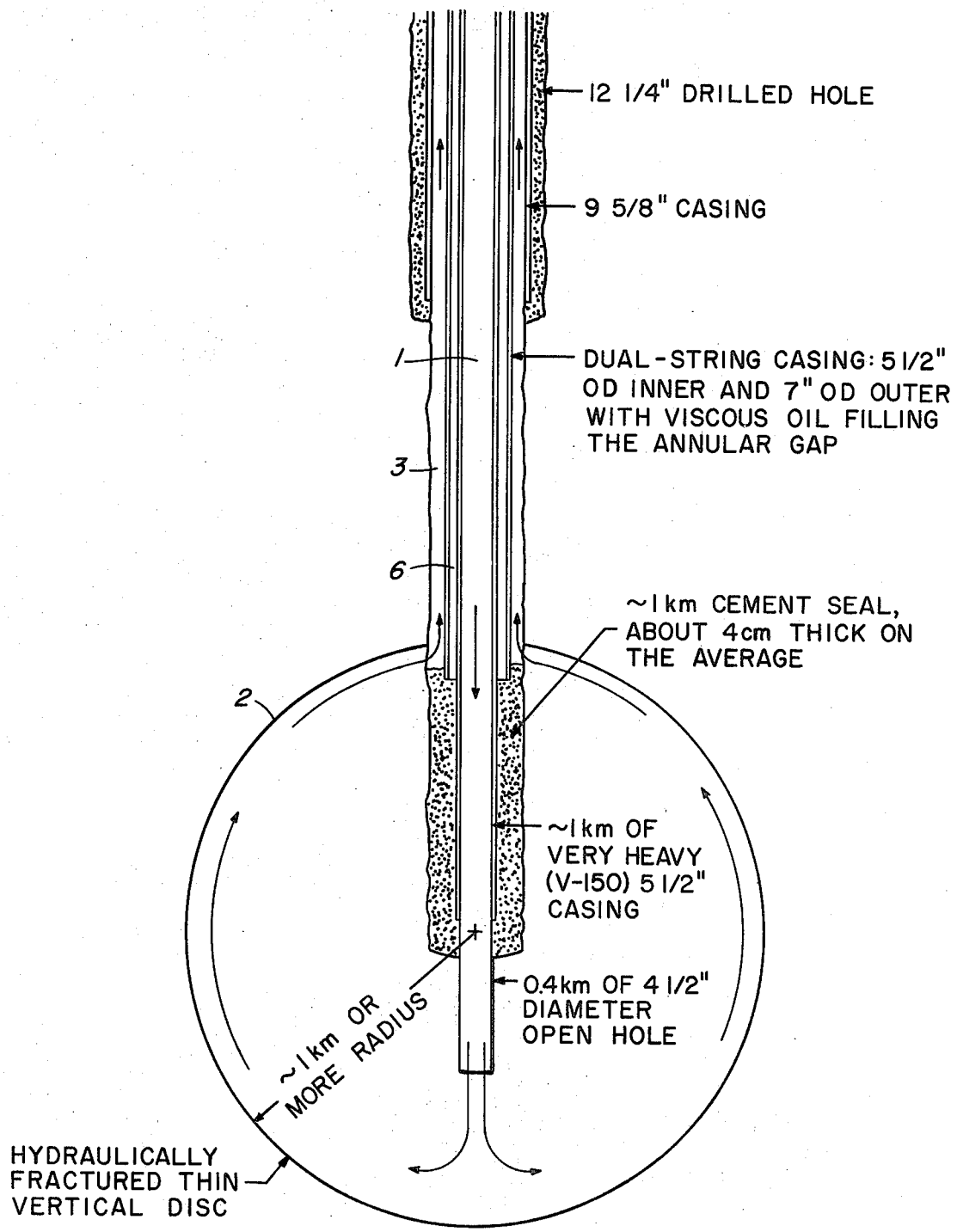
FIG. 2 is another schematic view of this invention showing a second embodiment employing concentric pipes to circulate a fluid through a geothermal reservoir.

Alternatively, or as a supplement to directional drilling, hydraulic fracturing could be repeated from the bottom of the second hole. A still further solution to this problem is shown in FIG. 2. The cold water is pumped down an inner pipe insulated by any well known means from the return heated water flowing up the outer pipe. Thus by placing a string of pipe within a larger pipe communication with the reservoir would be assured. In particular the inner pipe 1 having a viscous oil filling the annular gap 6 would be in communication with a hydraulically fractured thin vertical disc 2 which in turn is in fluid communication with outer return pipe 3, a suitable heat exchanger and power plant 4.

When the underground circulation system is completed, a heat-exchanger is installed at the surface, capable of extracting 150 MW of thermal energy from pressurized water entering it at 280° C and leaving it at 65° C. Removal of heat from the geothermal reservoir at this rate requires a water flow of only about 315 lb/sec, which is significantly less than the natural convective flow capability of the piping.

The following Table depicts a typical geothermal reservoir located in the Western United States:

RESERVOIR CHARACTERISTICS

Rock Type: Granite or other crystalline basement rock $K \sim 0.006$ cal/cm-sec-° C
$\rho \sim 2.7$ g/cm³
$C_p \sim 0.19$ cal/g-° C Hydraulically Fractured Crack:
  Radius $\sim 1.6$ km (5,250 ft)
  Volume $\sim 82,000$ m³ (21.6 × 10⁶ gal)
  Surface Area $\sim 16$ km² (0.17 × 10⁹ ft²)
Depth to Center of Reservoir: $\sim 5$ km (16,400 ft)
Rock Temperature at Center of Reservoir: 300° C (572° F)
Geothermal Gradient (Assumed):
  For crystalline basement rock: $\sim 45°$ C/km
  For overlying sedimentary rock: $\sim 75°$ C/km
  ($\sim 2$ km at $K = 0.0036$ cal/cm-sec-° C)

CASED AND DRILLED HOLE SIZES AND DEPTHS (Conventional oil field casing and drill bit sizes are assumed)
Injection (deeper) Hole:
  Depth $\sim 5$ km (16,400 ft)
  Upper Half: 17½ inches drilled hole, 13⅜ inches casing
  Lower Half: 12¼ inches drilled hole, 9⅝ inches casing
Withdrawal (shallower) Hole:
  Depth $\sim 3.5$ km (11,500 ft)
  Upper Two-thirds: 17½ inches drilled hole, 13⅜ inches casing
  Lower One-third: 12¼ inches open hole

RESERVOIR THERMAL/FLOW POTENTIAL

Reservoir Lifetime: $\sim 10$ years
(Excluding any contribution due to thermal stress cracking)
Average Pressurized Water Flow Rate: 265 kg/sec*
  (This is $\sim 6 \times 10^6$ gal/day at the earth inlet)
Earth Inlet Conditions:
  T = 65° C (149° F)
  P = 70 kg/cm² (1,000 psia)
Earth Outlet Conditions (Average):
  T = 280° C (536° F)
  P = 80 kg/cm² (1,140 psia)
Average Thermal Power: 250 MW
  [Potential Electrical Power Generation $\sim 50$ MW]
    (at a net efficiency of 20 percent)

*Natural convection only (no pumping) — conditions averaged over 10 year lifetime.

The original heat transfer surface area of the reservoir (the hydraulically fractured disc) is augmented by additional heat transfer surface area resulting from thermal stress cracking as the surface of the original reservoir cools. Removal of heat from a body of rock results in a volume contraction, $\Delta V$, given by $-\Delta V \cong 3H \bar{\alpha}/c\rho$, where $\bar{\alpha}$ is the linear coefficient of thermal expansion in ° C⁻¹, $c$ is the heat capacity of the rock in cal/g-° C, and $\rho$ is the rock density in g/cm³. This thermal contraction will result in fracturing of rock adjacent to the primary crack. Calculations have indeed shown that the rate of reservoir heat removal (or reservoir power level) will pass through a minimum and then increase beyond the initial reservoir heat removal rate due to subsequent thermal stress cracking of the reservoir rock. This reservoir extension phenomenon is due to a great extent to the viscosity variation of water by over a factor of five, between the reservoir inlet temperature ($\sim 65°$ C) and the hotter portions of the reservoir ($\sim 300°$ C), so the pressurized water will tend to preferentially flow toward the hotter portions of the reservoir.

For a reservoir depth of 15,000 ft, there is a pressure difference of about 1,500 psi between the descending cold water column and the ascending hot water column. This pressure difference arises from the 21 percent density difference between the cold and hot water columns. Thus, this $\Delta P$ is available to overcome fluid friction losses in the piping and heat exchanger, eliminating the need for a circulating pump in the pressurized water loop.

The essential novel features of the method disclosed herein are directed to the fact that thermal stress cracking of the reservoir rock as heat is removed by the convective flow of pressurized water would produce a continually enlarging crack system so as to significantly extend the useful life of the geothermal source. In fact, the heat quality (temperature level and available thermal energy) of the geothermal source should improve as energy is drawn from it. A second point is that hydraulic fracturing, although old in the oil field art, has never been used to fracture dry igneous or hot rock or for the express purpose of creating heat transfer surface area. The operating temperatures of the geothermal reservoir must be at least 150° C, and although there is no critical maximum temperature, one would not seek temperatures in excess of 500° C because of prohibitive drilling costs.

What we claim is:

1. A method of extracting energy from a dry igneous rock geothermal reservoir comprising:
    a. drilling a hole to such a depth as is required to encounter hot igneous rock in the range of 150° to 500° C;
    b. hydraulically fracturing from this hole to produce a large crack system in the rock;
    c. pumping cold fluid down the hole to establish underground circulation through the crack system;
    d. extracting thermal energy from the pressurized hot fluid rising in a shallower flow passage and then to a heat-exchanger at the surface; and
    e. re-introducing the cooled fluid from the heat-exchanger into the crack system.

2. The method of claim 1 in which the said cold fluid causes a second crack system to develop which is in communication with the initial crack system.

3. The method of claim 1 in which the said hole contains both the cold and hot fluid flow passages.

4. The method of claim 1 in which the temperature of said hot rock is about 300° C.

5. The method of claim 1 in which the said fluid is water.

* * * * *